(12) United States Patent
Tran et al.

(10) Patent No.: US 6,975,747 B2
(45) Date of Patent: Dec. 13, 2005

(54) METHOD AND SYSTEM FOR MONITORING AND CONTROLLING WORKPIECES

(75) Inventors: Don A. Tran, Lakeworth, FL (US); Kevin E. Duffey, Mount Laurel, NJ (US)

(73) Assignee: Acuity CiMatrix, Inc.

( * ) Notice: Subject to any disclaimer, the term of this patent is extended or adjusted under 35 U.S.C. 154(b) by 518 days.

(21) Appl. No.: 09/929,274

(22) Filed: Aug. 14, 2001

(65) Prior Publication Data

US 2003/0035577 A1   Feb. 20, 2003

(51) Int. Cl.[7] .......................... G06K 9/00; B65G 43/00; B07C 5/00
(52) U.S. Cl. ...................... 382/101; 198/340; 198/444; 209/552
(58) Field of Search .................... 198/301, 339.1, 198/340, 349.6, 341.03–341.09, 343.1, 348; 198/357, 358, 355, 367, 442, 444; 209/596–606, 209/538, 434, 193, 198, 546, 551, 552; 382/100, 382/141, 145, 287, 278, 295, 101, 209

(56) References Cited

U.S. PATENT DOCUMENTS

| | | | |
|---|---|---|---|
| 3,822,009 A * | 7/1974 | Richards ...................... 198/444 |
| 4,011,155 A | 3/1977 | Feurstein et al. .......... 209/74 R |
| 4,581,762 A | 4/1986 | Lapidus et al. ............... 382/22 |
| 4,667,231 A | 5/1987 | Pryor ......................... 358/107 |
| 4,796,997 A | 1/1989 | Svetkoff et al. ............ 356/376 |
| 4,818,380 A * | 4/1989 | Azegami et al. ............ 209/565 |
| 5,141,097 A * | 8/1992 | Oiry et al. ................ 198/460.1 |
| 5,165,520 A * | 11/1992 | Herve et al. ............. 198/460.1 |
| 5,551,686 A | 9/1996 | Sanchez et al. ............. 271/298 |
| 5,562,195 A * | 10/1996 | Isaacs ..................... 198/460.1 |
| 5,638,938 A * | 6/1997 | Lazzarotti et al. .......... 198/445 |
| 5,640,464 A | 6/1997 | Ebel et al. .................... 382/143 |
| 5,838,758 A | 11/1998 | Krug et al. .................... 378/53 |
| 5,868,239 A | 2/1999 | Bonnet .................. 198/370.02 |
| 5,920,056 A | 7/1999 | Bonnet ....................... 235/383 |
| 5,943,436 A | 8/1999 | Ebel et al. .................... 382/143 |
| 6,064,759 A | 5/2000 | Buckley et al. ............. 382/154 |
| 6,097,427 A | 8/2000 | Dey et al. ...................... 348/92 |
| 6,464,065 B2 * | 10/2002 | Herubel et al. .......... 198/460.1 |
| 6,471,044 B1 * | 10/2002 | Isaacs et al. ................. 198/809 |
| 6,629,018 B2 * | 9/2003 | Mondie et al. ............. 700/228 |
| 6,662,929 B1 * | 12/2003 | Neary et al. ............. 198/460.1 |
| 6,847,860 B2 * | 1/2005 | Mills et al. ................. 700/230 |

* cited by examiner

*Primary Examiner*—Vikkram Bali
*Assistant Examiner*—Wes Tucker
(74) *Attorney, Agent, or Firm*—Bourquer & Assoc.

(57) ABSTRACT

Methods and systems for monitoring the delivery of workpieces to a position by: storing a digital reference image of the position prior to the delivery of workpieces; storing a digital operating image of the position during delivery of workpieces; performing image arithmetic on the reference image and the operating image to produce a digital evaluation image comprised of a plurality of pixels; establishing a threshold image condition for the evaluation image that correlates to the existence of an operating condition relevant to the control of the delivery of workpieces; and examining the pixels in the evaluation image to determine whether the threshold image condition is met.

27 Claims, 5 Drawing Sheets

METHOD AND SYSTEM FOR MONITORING AND CONTROLLING WORKPIECES

FIELD OF THE INVENTION

The present invention relates to systems and methods for monitoring and controlling the delivery of workpieces to a location.

BACKGROUND OF THE INVENTION

Despite the increased automation of large-scale package handling systems, most such systems continue to have one or more steps performed manually, i.e., involving human operators handling the packages. In particular, prior to entering a sorting system packages are typically unloaded from vehicles onto a conveyor. The conveyor transports the packages to one or more slides, which are typically divided into multiple lanes. Diverter arms typically control which slide and lane packages will be diverted to at any given time. Human operators typically man individual lanes by moving the packages from the slide lanes to the sorting system. Multiple lanes are provided to distribute the delivery of the packages from the slide(s) to the sorting system among the available operators.

Typically, control of the diverter arms is based on a timing algorithm that changes the active lane at fixed predetermined intervals. Unfortunately, such a system does not always properly allocate packages to the available lanes. If the operators fail to clear a lane at the pace defined by the predetermined timing algorithm, the lane may become overfull causing possible damage to the packages and possible disruption of the automated portions of the package flow. Accordingly, there is a need for improved systems for monitoring package flow on slides.

SUMMARY OF THE INVENTION

The present invention is directed to a method for monitoring the delivery of workpieces to a position comprising the steps of: storing a digital reference image of the position prior to the delivery of workpieces; storing a digital operating image of the position during delivery of workpieces; performing image arithmetic on the reference image and the operating image to produce a digital evaluation image comprised of a plurality of pixels; establishing a threshold image condition for the evaluation image that correlates to the existence of an operating condition relevant to the control of the delivery of workpieces; and examining the pixels in the evaluation image to determine whether the threshold image condition is met.

The present invention is also directed to a method for controlling the flow of packages in a package handling system, the method comprising the steps of: activating a lane to receive packages from a package source and commencing a timer for the active lane; monitoring the fill status of at least the active lane; and deactivating the active lane when the timer reaches a predetermined limit or when the fill status reaches a predetermined limit.

The present invention is also directed to a method for controlling the delivery of packages from a package source to a plurality of lanes on a slide comprising the steps of: storing a digital reference image of at least a portion of the lanes prior to the delivery of packages; storing a digital operating image of at least a portion of the lanes during delivery of workpieces; performing image arithmetic on the reference image and the operating image to produce a digital evaluation image comprised of a plurality of pixels; establishing a threshold image condition for the evaluation image that correlates to whether a specified capacity of the lane has been exceeded; examining the pixels in the evaluation image to determine whether the threshold image condition is met; and generating a signal corresponding to whether the threshold image condition is met.

The present invention is also directed to a system for monitoring the flow of packages from a package source to a lane comprising the steps of: means for storing a digital reference image of at least a portion of the lanes prior to the delivery of packages; means for storing a digital operating image of at least a portion of the lanes during delivery of workpieces; means for performing image arithmetic on the reference image and the operating image to produce a digital evaluation image comprised of a plurality of pixels; means for storing a threshold image condition for the evaluation image that correlates to whether a specified capacity of the lane has been exceeded; and means for examining the pixels in the evaluation image to determine whether the threshold image condition is met.

The present invention is also directed to a system for controlling the flow of packages from a conveyor to a lane, comprising: means for activating and deactivating a lane to receive packages from the conveyor, wherein the lane activating and deactivating means comprises a timer; and means for monitoring the presence of packages on a lane.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
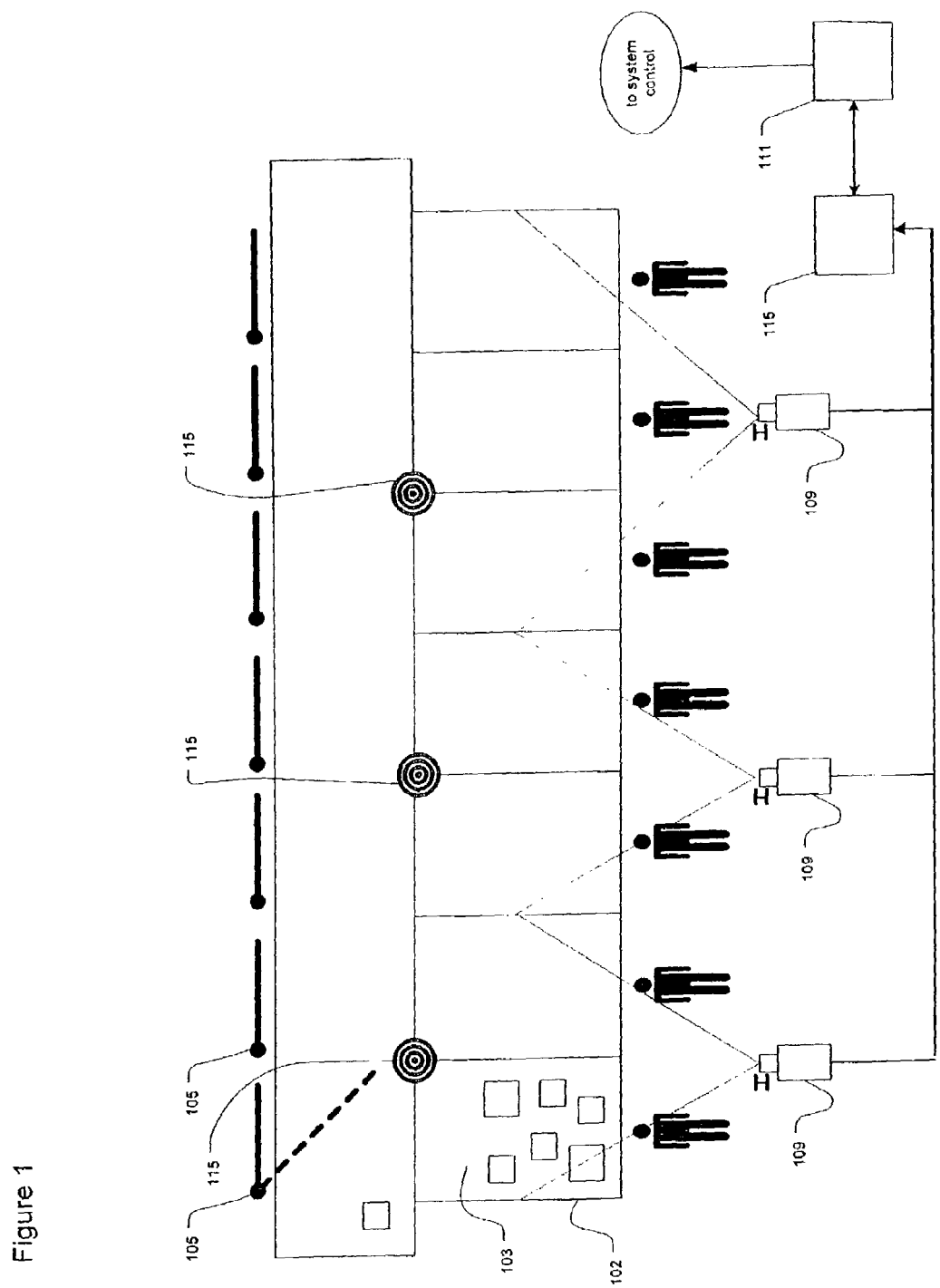
FIG. 1 is a schematic diagram of a package handling system incorporating the package flow control system of the present invention.
Figure 2:
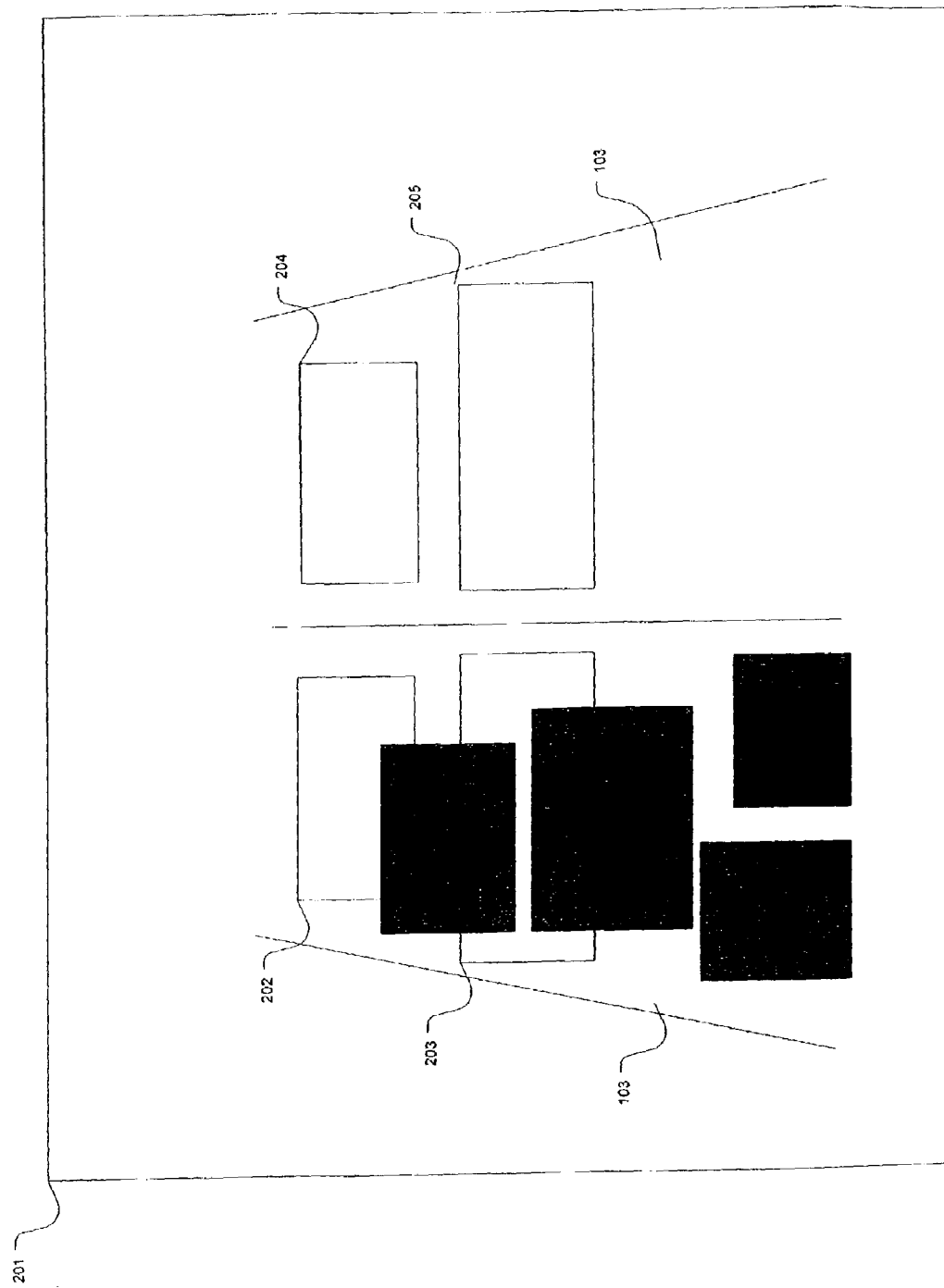
FIG. 2 is a schematic diagram of the view from a camera operating in accordance with the present invention.
Figure 3:
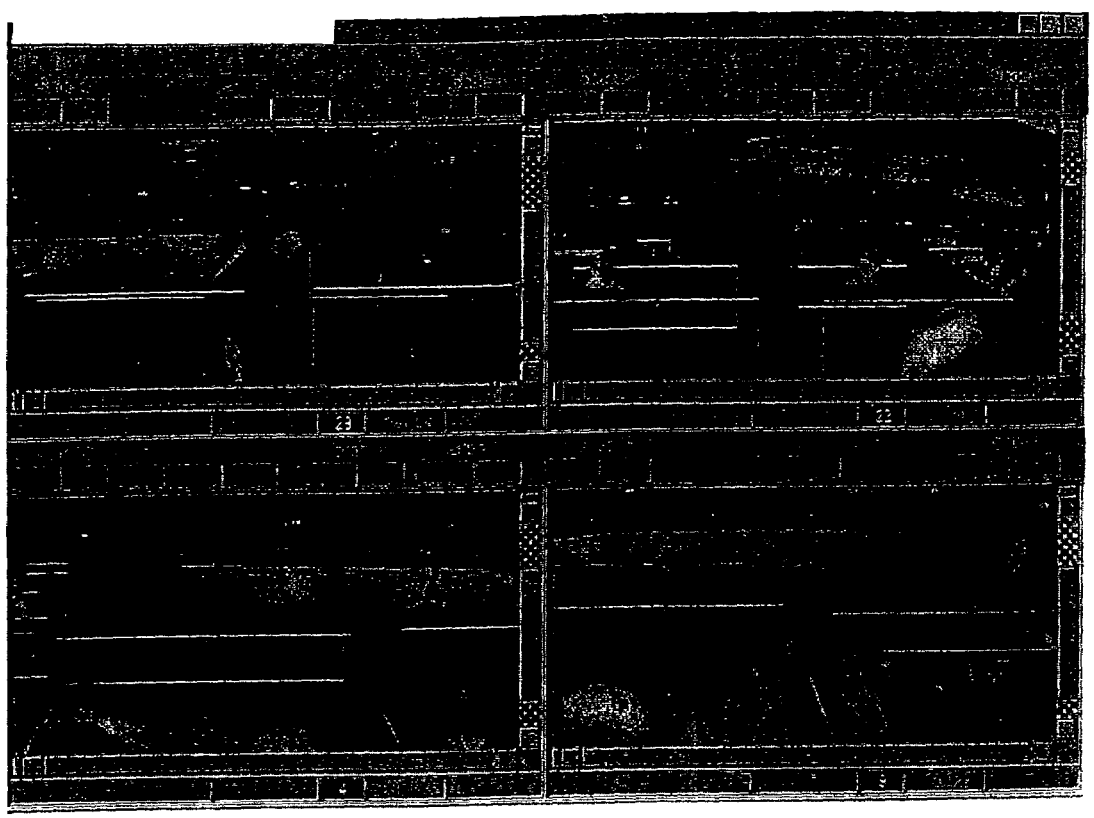
FIG. 3 is a screen capture of a graphical screen display of a system in accordance with the present invention.

The preferred embodiment of the present invention shown in FIGS. 1–3 is used in connection with a package handling system. However, it will be understood by those of ordinary skill in the art that the present invention has broad application to any automated processing system where it is desired to visually detect the presence of workpieces at a particular location or level.

Referring now to FIGS. 1–3, a common element in many package handling systems is a multi-lane slide that receives packages from a conveyor and delivers them to human operators who transfer the packages to a sorting system and/or perform other manual operations. Individual lanes are activated or deactivated by switching devices, such as diverter arms. FIG. 1 shows a schematic representation of an exemplary package handling system having a raised conveyor 101, a slide 102 with a plurality of lanes 103 and a plurality of diverter arm switches 105.

As used herein, the term slide refers to any device across which packages may be transferred. Typically, a slide is a simple stainless steel ramp relying on gravity to move packages from the entry point to the exit point. However, a slide may also include passive or driven rollers or a conveyor. A slide may have only a single lane, but typically has multiple lanes. As used herein, an active lane is a lane to which packages are currently being directed by the package handling system. An inactive lane is a lane to which packages are not currently being directed by the package handling system.

In accordance with a preferred embodiment of the present invention, a system for controlling the flow of packages from a conveyor to a lane, comprises means for controlling the switches that activate and deactivate the lanes and means for monitoring the presence of packages on the lanes. More particularly, the means for monitoring the presence of packages on the lanes monitors the extent to which the packages present on the lane, if any, are occupying the capacity of the lane to hold packages. This condition is referred to herein as the fill status of the lane.

The means for monitoring the fill status of the lanes comprises means for storing digital images. The means for storing digital images comprises at least one camera 109 and a computer having a memory sufficient to store reference and operating images from the cameras 109. Each camera may monitor one or more lanes. In a preferred embodiment, each camera monitors 2–3 lanes. Thus, the number of cameras required depends primarily upon, the number of lanes, the size of the lanes, and the resolution of the cameras. Each camera must have sufficient resolution to capture images sufficient for the image processing operations described below. The minimal and preferred resolution varies with the size and shape of the packages being monitored. In a preferred embodiment, the cameras generate images comprised of at least about 76,800 pixels (320×240). In addition, the image capture rate for a camera for use in accordance with the present invention depends upon the overall organization and operation of the package handling system.

The means for controlling the switches that activate and deactivate the lanes is any computer with sufficient resources to carry out the image processing, control and signal generating functions described below. The functions of the computer may be centralized or distributed. In a preferred embodiment, the image storage and processing functions are processed by a PC 115 and the control of the switches the means for controlling the switches that activate and deactivate the lanes is a programmable logic controller (PLC) 111. The PC 115 is preferably in 2-way communication with the PLC whereby the PLC periodically polls the PC concerning the fill status of the lanes and the PC provides the fill status information in response to the inquiry from the PLC. Alternatively, both sets of operations could be handled by a single computer, be it a PC or PLC. The computer performing the image processing operations must have sufficient memory and processing capacity to perform the functions set forth below.

The PC 115 comprises a processor capable of running the image processing software at the desired rate. Image processing software in accordance with the present invention may be any form of image processing software capable of performing the image arithmetic and image examination steps described below. In a preferred embodiment of the present invention, the image processing software employs the Sobel edge detection algorithm and/or is capable of performing blob analysis. The software is described in more detail in connection with the disclosure of the methods in accordance with the present invention.

In a preferred embodiment of the present invention, the PLC comprises timing software. The timing software commences a timer when a lane is activated. In a preferred embodiment, if the time count on an active lane reaches a pre-set limit, the lane is deactivated and an alternative lane may be activated. The interaction between the timing control and the vision control of the lanes is described in more detail below.

In a preferred embodiment of the present invention, the PC 115 comprises scheduling software, which may or may not be integral with the image processing software. The scheduling software tracks the time of day and schedules the capture of reference images at times determined by an operator. In addition, during package handling operations, the scheduling software selects which reference image should be used based upon the then-current time of day.

The PC 115 is in communication with the camera(s) 109 by a data link 113. The requisite bandwidth of the data link depends upon the resolution of the captured images and the sampling rate. In a preferred embodiment, the data link is an RG 59 derivative cable capable of transmitting an RS 170 signal.

The PC also comprises or is in communication with an output device for signaling the fill status of the lanes to the operator. The output device 113 may be any device capable of signaling the lane fill status to an operator. In a preferred embodiment, the output device is a monitor showing the then current operating image from each camera and having one or more fill status indicators for each lane. As shown in FIG. 3, a display in accordance with the present invention shows current images from each camera and has two indicators for each lane. A first indicator indicates whether a lane is 100% full. A second indicator indicates whether a lane is 75% full.

In a preferred embodiment, the present invention further comprises means for validating that the camera(s) 109 are in the proper position. The camera position validating means preferably comprises a fixed reference target 115 mounted on, or in a fixed position relative to, or forming an integral part of the package handling system. Prior to running the package handling system, the camera 109 captures an image of the reference target 115—the reference image. During package handling operations, the camera 109 periodically captures an image of the reference target—an operating image. The frequency of capturing operating images depends upon the environment, particularly, the likelihood that the camera position will be altered, the desired sensitivity of the lane full detection system, and the error rate of the image detection algorithm. In a preferred embodiment, operating images are generated about every 450 milliseconds. The PC compares each operating image to the corresponding reference image for that camera. If there is any significant difference between the reference image and the operating image, the PC signals that the camera is out of position and/or adjusts the image arithmetic and examinations to account for the change in the camera position.

The present invention is also directed to methods for monitoring and controlling the flow of workpieces, such as packages, in an automatic processing system, such as a package handling system.

Figure 4:
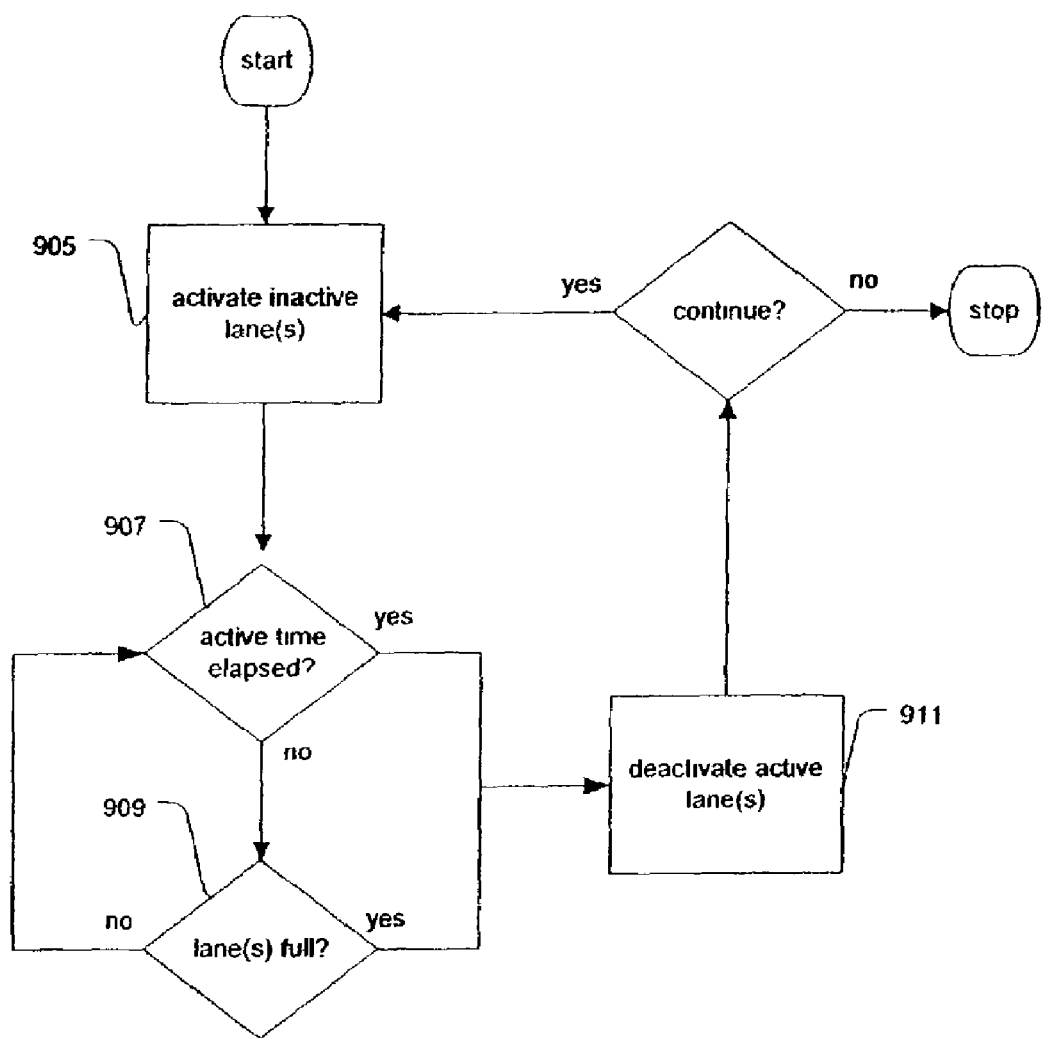
FIG. 4 is a flow diagram showing a method for controlling delivery of packages in accordance with the present invention.

Referring now to FIG. 4 there is shown a process flow diagram for methods for controlling the flow of packages in a package handling system in accordance with a preferred embodiment of the present invention. In a preferred embodiment, these steps are performed by the PLC shown in FIG. 1.

In step 905, the PLC activates a lane. Preferably, the computer maintains a list of lanes and an index position representing the next lane(s) in the list to be activated—an on-deck index. In a preferred embodiment, the computer may determine the lane fill status prior to activating a lane. Upon activating a lane, the computer starts a timer to track the activation time of the active lane(s). The computer also increments the on-deck index.

In step 907, the computer determines whether the active lane timer has reached a predetermined limit. If the lane timer has reached a predetermined limit, the computer proceeds to step 911 in which it deactivates the active lane and then returns to step 905 to select a new active lane. If the computer determines that the timer has not reached the predetermined limit the computer proceeds to step 907.

In step 907, the PLC polls the PC to determine at least the lane fill status of at least the active lane(s). Preferably, the PLC requests and the PC sends the lane fill status information for all of the lanes. If the lane fill status for the active lane has reached a predetermined limit, the PLC proceeds to step 911. The PC may also send a signal to a display or other alert mechanism indicating that the predetermined fill status has been reached. In a preferred embodiment of the present invention, two fill status conditions are defined, 75% full and 100% full. When the 75% full status is reached, the PC displays this condition on a visual display, but the PLC does not deactivate the active lane(s). When the 100% full status is reached, the PC displays this condition on a visual display and the PLC proceeds to step 911 to deactivate the active lane(s).

FIG. 10 illustrates the steps involved in monitoring the fill status of the lanes and in checking the camera position. In step 1000, each camera captures an image of the empty lane(s) monitored by that camera. Empty lane reference images are transmitted to and stored in the PC for later use in determining the lane fill status. In a preferred embodiment, the reference image also includes an image of the fixed reference target 115. In a preferred embodiment, because ambient light conditions and other environmental factors may vary during the day, step 1000 comprises the capture of a plurality of reference images for each camera taken at different times of day. Selection of the ideal number and timing of reference images depends upon the specific environment in which the system is employed. However, in a typical deployment, reference images are obtained for daytime and nighttime operations. In addition, additional sets of reference images may be captured for environmental conditions not related to the time of day, such as daily weather conditions and the like. In addition to or instead of storing multiple references images, a preferred embodiment of the present invention comprises the step of controlling the ambient light conditions in the vicinity of the lanes by, for example, installing sufficient lighting to eliminate variances in ambient conditions and/or by minimizing external light sources.

In step 1001, the camera captures an operating image. The frequency of capturing operating images may vary depending upon how fast the fill status (or other) condition is expected to be reached. The frequency of capturing operating images may also vary depending upon the error tolerance in the particular application. Low error tolerance and higher processing speeds require more frequent operating images and vice versa. In a preferred embodiment of the present invention each camera preferably captures a reference image about every 450 milliseconds.

In step 1003, the PC performs image arithmetic on the operating image and the reference image to generate an evaluation image. In a preferred embodiment, step 1003 comprises generating an unsigned difference image from the reference and operating images.

In step 1004, the PC examines the evaluation image to determine whether a pre-defined threshold image condition is met. Threshold image conditions are defined based on a desired correlation to a condition relevant to the control of the workpiece processing system. For example, in the case of the package handling system disclosed herein, a threshold image condition correlates to whether a lane has sufficient packages on it to be considered 75% full and a second condition correlates to 100% full. As shown in FIG. 2, in this preferred embodiment of the present invention employing an unsigned difference image as an evaluation image, portions 202–205 of the evaluation image 201 are selected for each lane for evaluation corresponding to the first and second conditions in each of the 2 pictured lanes. Each portion is then evaluated by assigning a value to every pixel in the portion of the image based upon the brightness of the pixel. In a preferred embodiment of the present invention, the value assigned to each pixel is either 1 or 0 depending upon whether the pixel brightness exceeds a variable threshold based upon the ambient light conditions. The image condition is met if the total pixel value in the selected portion of the evaluation image exceeds a given threshold. In the present example, if at least about 25% of the pixels in a selected portion are positive (have a value of 1) then the condition is satisfied.

As set forth above, the precise selection of this threshold depends upon several factors, including, the pixel brightness threshold and the acceptable error tolerance. Other image evaluation techniques may also be used in methods of the present invention including known edge detection algorithms or blob analysis algorithms and the like.

In step 1005, the computer generates a signal reflecting the fill status of the lane, which is used in step 909 in FIG. 4. The process shown in FIG. 5 may be part of step 909 of FIG. 9 or it may run in parallel to the steps shown in FIG. 4. In a preferred embodiment of the present invention where the fill status of all lanes is continuously monitored, the process of FIG. 5 proceeds substantially continuously for each camera in the system. That is, the method is repeated for each camera at a frequency matching the rate at which each camera captures new operating images.

Step 1003 further preferably comprises the step of selecting a reference image from among the plurality of reference images for that camera most likely to have the same ambient light and other environmental conditions present when the operating image is captured. Accordingly, step 1003 preferably comprises the step of determining the current time of day and selecting the reference image captured at most nearly the same time of day. In addition, the selection of reference image could also depend upon other environmental conditions specified by the operator, such as external weather conditions—e.g., sunny, partly-sunny, cloudy, etc—so long as corresponding reference images were captured in step 901 (FIG. 4).

Figure 5:
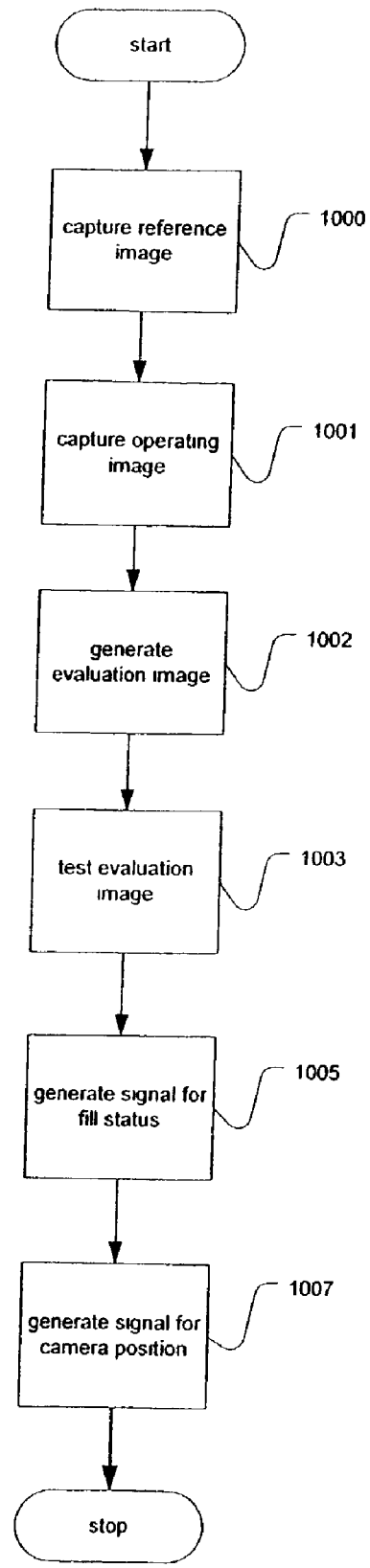
FIG. 5 is a flow diagram showing a portion of a method in accordance with the present invention.

FIG. 5 also illustrates the steps involved in determining the camera position status. In step 1001, the camera captures an operating image. In step 1003, the computer compares the operating image to the reference image, particularly, the portion of each image containing the fixed reference target, using known image comparison algorithms. In step 1007, the computer generates a signal reflecting the camera position status of the camera. As shown in FIG. 10, this process may be completed simultaneously with the steps required to determine the lane fill status or thee steps may run as yet another parallel process. The frequency of repeating the steps required to determine the camera position may be the same as or different from the frequency of repeating the steps required to determine the lane fill status.

Modifications and substitutions by one of ordinary skill in the art are considered to be within the scope of the present invention, which is not to be limited except by the following claims.

What is claimed is:

1. A method for monitoring the delivery of workpieces to a position comprising the steps of:
    storing a digital reference image of the position prior to the delivery of workpieces;
    storing a digital operating image of the position during delivery of workpieces;
    performing image arithmetic on the reference image and the operating image to produce a digital evaluation image comprised of a plurality of pixels;
    establishing a threshold image condition for the evaluation image that correlates to the existence of an operating condition relevant to the control of the delivery of workpieces;
    examining the pixels in the evaluation image to determine whether the threshold image condition is met.

2. The method of claim 1, wherein the step of performing image arithmetic comprises the step of producing a difference image.

3. The method of claim 1, wherein the step of performing image arithmetic comprises the step of producing an unsigned difference image.

4. The method of claim 1, wherein the step of storing a digital reference image comprises the step of storing a plurality of different digital reference images corresponding to different environmental conditions and the step of performing image arithmetic comprises the selection of the digital reference image that is expected to correspond most closely to the operating image.

5. The method of claim 4, wherein different reference images are stored at different times of day and wherein the step of performing image arithmetic comprises selecting the reference image corresponding to the time of day when the operating image was stored.

6. The method of claim 1, further comprising the step of controlling the ambient light condition in the vicinity of the position.

7. The method of claim 1 wherein the threshold image condition comprises a pixel value threshold and the step of examining the pixels in the evaluation image to determine whether the threshold image condition is met comprises the step of assigning a value to a pixel in the evaluation image based upon the brightness of the pixel.

8. The method of claim 1 wherein the threshold image condition comprises a pixel value threshold and the step of examining the pixels in the evaluation image to determine whether the threshold image condition is met comprises the step of assigning a value to a pixel in the evaluation image based upon the brightness of the pixel and the brightness of at least one adjacent pixel.

9. The method of claim 1, further comprising the step of checking a camera position reference.

10. The method of claim 9, wherein the step of checking a camera position reference comprises the step of examining a portion of the evaluation image that corresponds to a portion of the reference image that contains a camera position target.

11. A method for controlling the delivery of packages from a package source to a plurality of lanes on a slide comprising the steps of:
    storing a digital reference image of at least a portion of the lanes prior to the delivery of packages;
    storing a digital operating image of at least a portion of the lanes during delivery of workpieces;
    performing image arithmetic on the reference image and the operating image to produce a digital evaluation image comprised of a plurality of pixels;
    establishing a threshold image condition for the evaluation image that correlates to whether a specified capacity of the lane has been exceeded;
    examining the pixels in the evaluation image to determine whether the threshold image condition is met; and
    generating a signal corresponding to whether the threshold image condition is met.

12. The method of claim 11, wherein the step of performing image arithmetic comprises the step of producing a difference image.

13. The method of claim 11, wherein the step of performing image arithmetic comprises the step of producing an unsigned difference image.

14. The method of claim 11, wherein the step of storing a digital reference image comprises the step of storing a plurality of different digital reference images corresponding to different environmental conditions and the step of performing image arithmetic comprises the selection of the digital reference image that is expected to correspond most closely to the operating image.

15. The method of claim 14, wherein different reference images are stored at different times of day and wherein the step of performing image arithmetic comprises selecting the reference image corresponding to the time of day when the operating image was stored.

16. The method of claim 11, further comprising the step of controlling the ambient light condition in the vicinity of the lanes.

17. The method of claim 11 wherein the threshold image condition comprises a pixel value threshold and the step of examining the pixels in the evaluation image to determine whether the threshold image condition is met comprises the step of assigning a value to a pixel in the evaluation image based upon the brightness of the pixel.

18. The method of claim 11 wherein the threshold image condition comprises a pixel value threshold and the step of examining the pixels in the evaluation image to determine whether the threshold image condition is met comprises the step of assigning a value to a pixel in the evaluation image based upon the brightness of the pixel and the brightness of at least one adjacent pixel.

19. The method of claim 11, further comprising the step of checking a camera position reference.

20. The method of claim 19, wherein the step of checking a camera position reference comprises the step of examining a portion of the evaluation image that corresponds to a portion of the reference image that contains a camera position target.

21. The method of claim 11, wherein the step of establishing a threshold image condition comprises the step of establishing a plurality of threshold image conditions.

22. A system for monitoring the flow of packages from a package source to a lane comprising the steps of:

means for storing a digital reference image of at least a portion of the lane prior to the delivery of packages;

means for storing a digital operating image of at least a portion of the lane during delivery of workpieces;

means for performing image arithmetic on the reference image and the operating image to produce a digital evaluation image comprised of a plurality of pixels;

means for storing a threshold image condition for the evaluation image that correlates to whether a specified capacity of the lane has been exceeded;

means for examining the pixels in the evaluation image to determine whether the threshold image condition is met.

23. The system of claim 22, further comprising means for controlling changes in the ambient light condition in the vicinity of the lane.

24. The system of claim 22 wherein the means for examining the pixels in the evaluation image comprises means for assigning a value to a pixel in the evaluation image based upon the brightness of the pixel.

25. The system of claim 22 wherein the means for examining the pixels in the evaluation image comprises means for assigning a value to a pixel in the evaluation image based upon the brightness of the pixel and the brightness of at least one adjacent pixel.

26. The system of claim 22, further comprising means for checking a camera position reference.

27. The system of claim 26, wherein means for checking a camera position reference comprises means for examining a portion of the evaluation image that corresponds to a portion of the reference image that contains a camera position target.

* * * * *